(12) United States Patent
Cirker (10) Patent No.: US 8,137,009 B2
(45) Date of Patent: *Mar. 20, 2012

(54) PRIVACY ENSURING CAMERA ENCLOSURE

(76) Inventor: Seth Cirker, Port Washington, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/964,692

(22) Filed: Dec. 9, 2010

(65) Prior Publication Data

US 2011/0103786 A1    May 5, 2011

Related U.S. Application Data

(63) Continuation of application No. 11/859,485, filed on Sep. 21, 2007, now Pat. No. 7,874,744.

(51) Int. Cl.
*G03B 17/00* (2006.01)
*G03B 29/00* (2006.01)

(52) U.S. Cl. ........................................ 396/427; 396/433
(58) Field of Classification Search .................. 396/427, 396/433

See application file for complete search history.

(56) References Cited

U.S. PATENT DOCUMENTS

| | | | |
|---|---|---|---|
| 4,019,192 A | 4/1977 | Miyagawa | |
| 4,080,629 A | 3/1978 | Hammond | |
| 4,978,984 A | 12/1990 | Brookfield | |
| 5,455,561 A | 10/1995 | Brown | |
| 5,610,656 A | 3/1997 | Bernhardt | |
| 5,740,480 A | 4/1998 | Kuhn, Jr. et al. | |
| 6,064,430 A | 5/2000 | Lefkowitz | |
| 6,354,749 B1 | 3/2002 | Pfaffenberger, II | |
| D470,522 S | 2/2003 | Friedricks et al. | |
| 6,524,020 B2 | 2/2003 | Ellinger et al. | |
| 6,652,164 B2 | 11/2003 | Stiepel et al. | |
| 6,768,868 B1 | 7/2004 | Schnell | |
| 6,816,073 B2 | 11/2004 | Vaccaro et al. | |
| 6,850,025 B1 | 2/2005 | Paolantonio et al. | |
| 6,917,293 B2 | 7/2005 | Beggs | |
| 7,066,662 B2 | 6/2006 | Cuddeback | |
| 7,095,328 B1 | 8/2006 | Stern et al. | |
| 7,187,279 B2 | 3/2007 | Chung | |
| 7,217,045 B2 | 5/2007 | Jones | |
| 7,463,145 B2 | 12/2008 | Jentoft | |
| 7,477,285 B1 | 1/2009 | Johnson | |
| 8,000,588 B1 * | 8/2011 | Harvey | 396/12 |
| 2001/0037509 A1 | 11/2001 | Kligman | |
| 2002/0081110 A1 * | 6/2002 | Johnson et al. | 396/12 |

(Continued)

FOREIGN PATENT DOCUMENTS

EP    1244322 A1    6/2005

(Continued)

OTHER PUBLICATIONS

Supplemental European Search Report, EP 08 83 1720, Nov. 22, 2010 (7 pgs.).

(Continued)

*Primary Examiner* — Rodney Fuller
(74) *Attorney, Agent, or Firm* — Holland & Hart LLP (57) ABSTRACT

A privacy ensuring camera enclosure with a camera enclosing configuration and a surveillance configuration wherein the camera enclosing configuration entirely surrounds a surveillance camera such that it is visibly removed from a privacy sensitive area, thereby preserving the expected level of privacy in the privacy sensitive area; the enclosure is configured to dynamically change from the camera enclosing configuration to the surveillance configuration in response to a heightened threat level.

19 Claims, 8 Drawing Sheets

U.S. PATENT DOCUMENTS

| | | |
|---|---|---|
| 2003/0102967 A1 | 6/2003 | Kao |
| 2003/0185556 A1 | 10/2003 | Stiepel et al. |
| 2004/0003051 A1 | 1/2004 | Krzyzanowski et al. |
| 2004/0075547 A1 | 4/2004 | Vojtech et al. |
| 2005/0104773 A1 | 5/2005 | Clarke et al. |
| 2005/0119584 A1 | 6/2005 | Carter |
| 2005/0146609 A1 | 7/2005 | Creamer et al. |
| 2005/0146610 A1 | 7/2005 | Creamer et al. |
| 2005/0149979 A1 | 7/2005 | Creamer et al. |
| 2005/0181762 A1 | 8/2005 | Kauppila |
| 2005/0288075 A1 | 12/2005 | Geernaert |
| 2006/0000971 A1 | 1/2006 | Jones |
| 2006/0022829 A1 | 2/2006 | Pan |
| 2006/0064384 A1 | 3/2006 | Mehrotra et al. |
| 2006/0081343 A1 | 4/2006 | Clark et al. |
| 2006/0098729 A1 | 5/2006 | Shen |
| 2006/0253885 A1 | 11/2006 | Murphy |
| 2007/0011722 A1 | 1/2007 | Hoffman |
| 2007/0013513 A1 | 1/2007 | Tang et al. |
| 2007/0269202 A1 | 11/2007 | Forsyth-Martinez |
| 2008/0198159 A1 | 8/2008 | Liu et al. |
| 2008/0198231 A1* | 8/2008 | Ozdemir et al. ............... 348/159 |
| 2008/0224862 A1* | 9/2008 | Cirker ............................ 340/541 |
| 2008/0259161 A1 | 10/2008 | Hellman |
| 2008/0288986 A1 | 11/2008 | Foster et al. |
| 2009/0021593 A1 | 1/2009 | Nozaki |
| 2009/0028542 A1 | 1/2009 | Nakamoto et al. |
| 2009/0098820 A1 | 4/2009 | Yabu |
| 2009/0138138 A1 | 5/2009 | Ferren et al. |
| 2009/0185036 A1 | 7/2009 | Bowron |

FOREIGN PATENT DOCUMENTS

| | | |
|---|---|---|
| GB | 2384933 A | 8/2003 |
| GB | 2393343 A | 3/2004 |
| JP | 56099835 | 8/1981 |
| JP | 2002158904 | 5/2002 |
| KR | 1020030052511 A | 6/2003 |
| WO | 9501041 A1 | 1/1995 |
| WO | 0117247 A1 | 3/2001 |
| WO | 0156294 A1 | 8/2001 |
| WO | 03041026 A1 | 5/2003 |
| WO | 2004095386 A1 | 11/2004 |

OTHER PUBLICATIONS

Polycom, ViaVideo User's Guide, Nov. 2000.

iSight User's Guide, Apple Computer, Inc., 2004.

* cited by examiner

PRIVACY ENSURING CAMERA ENCLOSURE

RELATED APPLICATIONS

Cross-Reference to Related Patent Applications

This application is a continuation application of 35 U.S.C. §120 of U.S. patent application Ser. No. 11/859,485, now issued U.S. Pat. No. 7,874,744, titled "Privacy Ensuring Camera Enclosure" filed on Sep. 21, 2007, which application is incorporated herein by reference in its entirety.

BACKGROUND

Surveillance or monitoring apparatuses often use at least one video camera, allowing surveillance images to be viewed and/or recorded at a remote location (710). For example, an industrial facility, a public school, or a medical facility may have several video cameras at various locations throughout the facility, each camera being communicatively coupled to a respective video screen at one or more central security station(s).

More recently, video cameras have been developed that can be coupled to a computer hosting any number of software programs capable of converting video images received from the video cameras into a digital format, or in other words a document compatible with the Internet standard known as the world wide web (www). Further, personal communication devices such as cellular phones, pagers, and personal digital assistants (PDAs) are becoming increasingly popular commercial products, as wireless communication technology becomes widespread and affordable. Additionally, a number of cellular phone manufacturers are manufacturing and selling camera phones or other smart phones having video displays capable of displaying received images or camera capabilities capable of generating desired images. Consequently, it is possible to transmit a surveillance image from a known video camera to a personal communication device using image conversion software.

The use of the ever improving monitoring and imaging devices that may be used for security and surveillance are tempered by the concept of an individual's right to privacy. That is, there are a number of locations, such as within restrooms, changing rooms, and even classrooms, where permanently active monitoring devices are not appropriate. However, when high risk situations such as shootings, hostage situations, or natural disasters occur, an individual's right to privacy may be superseded by a need for surveillance.

While existing monitoring systems have traditionally been adequate for their intended purposes, they have not been satisfactory in all respects. For example, and as mentioned above, when a high risk situation occurs, traditional monitoring systems do not provide a convenient way for the owner or authorities to monitor previously restricted locations.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

An exemplary privacy ensuring camera enclosure promotes the privacy of individuals within the privacy sensitive area, while allowing critical video surveillance to occur during times of crisis. In one exemplary embodiment, the camera enclosure contains the camera behind opaque doors. In this state, the camera is not visible to the individuals within the privacy sensitive area and has no means of optically sensing activities outside the camera enclosure. During times of elevated threat, the opaque doors can be opened and the camera can be extended through the opening to acquire surveillance footage. The extended camera becomes immediately visible when extended, alerting individuals that they no longer can expect privacy within the privacy sensitive area. Thus, the enclosure provides privacy for the individuals when the opaque doors are closed while allowing the camera to be extended during times of elevated threat. By visibly retracting the camera from the room or other area under surveillance, the individuals are reassured that they are not under surveillance. The right to privacy is insured until the privacy threshold is exceeded for a particular privacy sensitive area.

In one exemplary embodiment, the camera enclosure can be part of a selectively enabled threat based information system. As detailed in Ser. No. 11/717,806, which is hereby incorporated by reference in its entirety, a surveillance system assigns a privacy threshold to privacy sensitive areas, receives a current threat level indicator, compares the current threat level indicator to the privacy threshold, and if the current threat level indicator exceeds the privacy threshold, identifies surveillance components associated with the privacy sensitive areas and activates the identified surveillance components. In one exemplary embodiment, the privacy ensuring camera enclosure and the contained camera can be selectively activated surveillance components. Activating the surveillance camera comprises, among other things, opening the opaque doors covering the surveillance camera or otherwise optically admitting the camera into the privacy sensitive area.

By way of example, a school may contain a variety of privacy sensitive areas. Cafeterias, libraries, hallways, lobbies, doors, and school grounds are areas where only minimal privacy is required or expected by individuals. However, classrooms, bathrooms, locker rooms, and offices are areas where significant privacy is required for individuals to comfortably perform activities such as teaching, counseling, open discussions, dressing, etc. The intrusion of security cameras into these privacy sensitive areas, absent a significant threat, will have a negative impact on the function of the school. The use of privacy ensuring camera enclosures removes surveillance cameras from the privacy sensitive area until a threat level rises above the privacy threshold value, thereby preserving the normal functioning and expectation of privacy of individuals within the privacy sensitive area.

Figure 1:
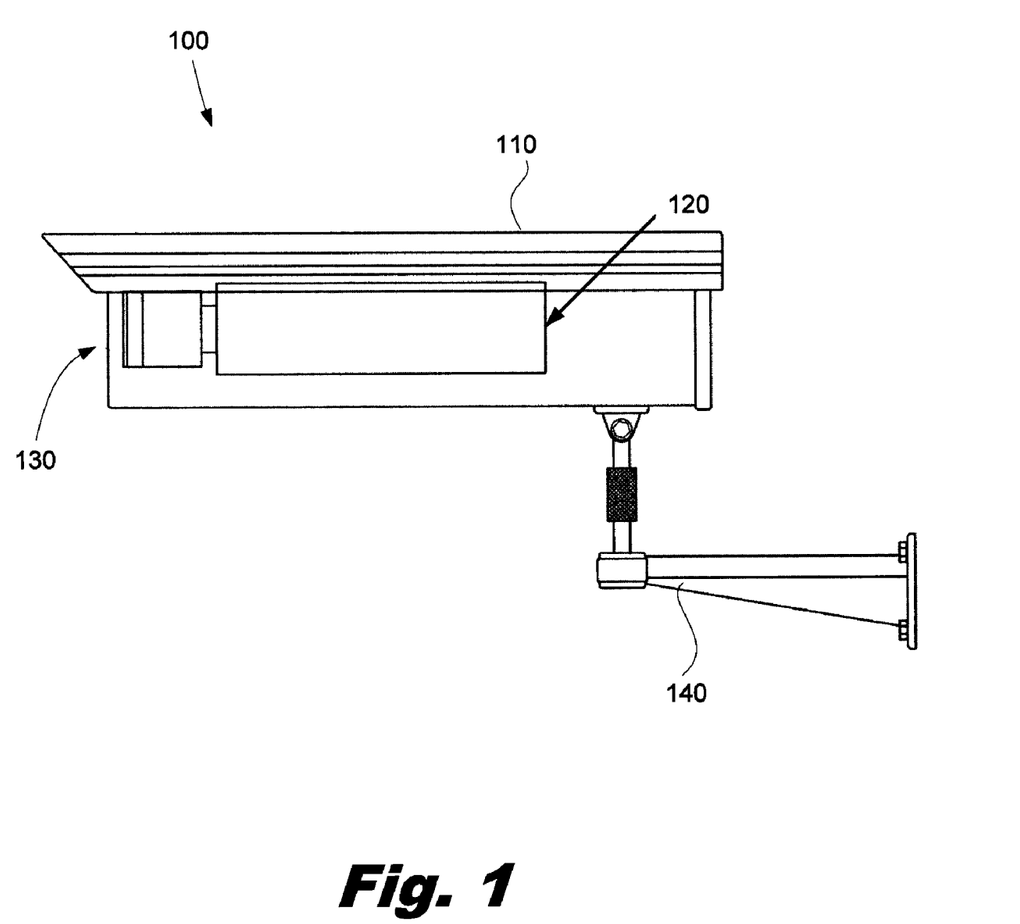
FIG. 1 is a side view of a surveillance camera and housing, according to principles described herein.

FIG. 1 shows a side view of a surveillance camera (120) and its associated housing (110) and mount (140). The mount (140) is secured in the desired location to a support member (not shown). The support member may consist of a wall, post, floor, ceiling or other suitable object. The mount (140) may be secured to the support member by any number of appropriate means including fasteners, adhesives, bands, or other means. The mount may consist of a plurality of parts, including a stationary base, adjustable components, and an attachment point. The adjustable components may allow the camera (120) and the enclosure (110) to be pointed in the appropriate orientation and/or adjusted to optimize the camera's position. The mount may also incorporate a variety of mechanisms and actuators such as motorized pan or tilt stages.

The surveillance camera (120) is typically housed inside an enclosure (110). The enclosure (110) controls the internal environment in which the camera operates. The enclosure can be used to control temperature, humidity, and stray light. In addition, enclosures can protect the camera from a variety of environmental hazards such as dust, wind, projectiles, and vandalism. In some cases the enclosure (130) is specifically designed to hide or camouflage the camera (120). The enclosure can include power and communication connections, a sun screen to limit the amount of sunlight incident on the camera, fans, filters to allow the exchange of air within the enclosure, wipers to clean a window, and other accessories.

Typically, the enclosure includes a viewing port (130) through which the camera observes the surroundings. The viewing port (130) can comprise an aperture in the enclosure wall that is covered by glass or another transparent medium. In some cases, it may be desirable to cover or obscure the viewing port (130) to prevent the camera (120) from viewing the surroundings, thereby protecting the privacy of the individuals in a privacy sensitive area.

Figure 2A:
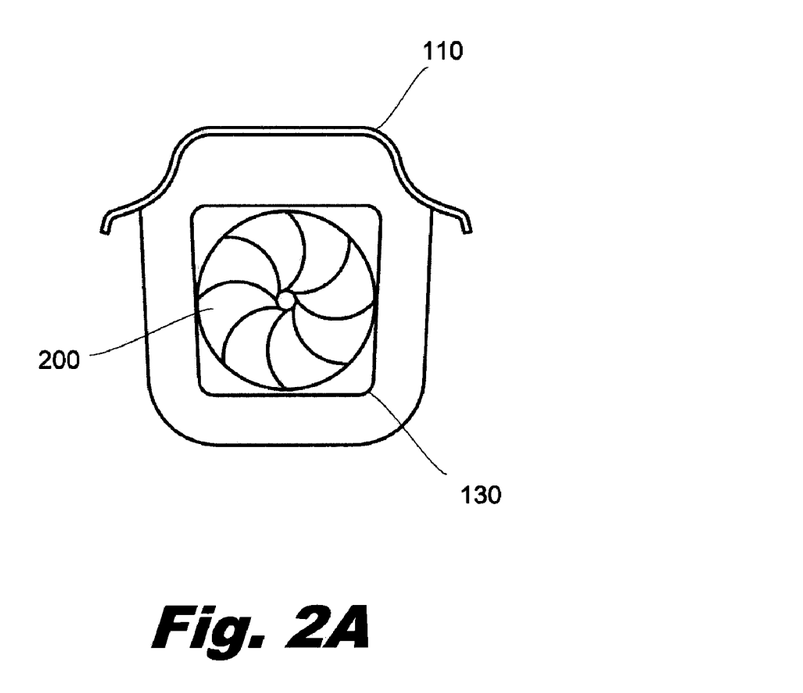
FIG. 2A and FIG. 2B are frontal views of a surveillance camera and housing, according to principles described herein.
Figure 2B:
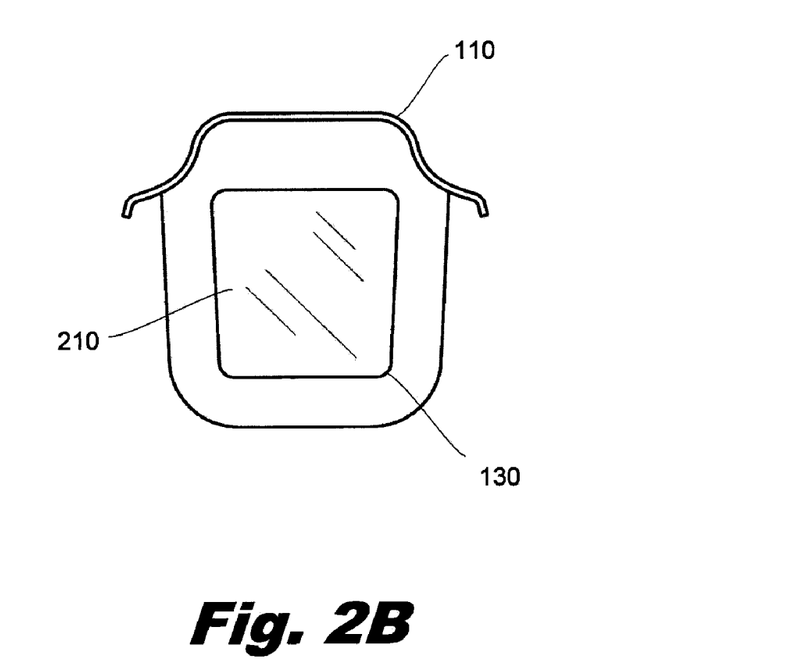
Figure 3:
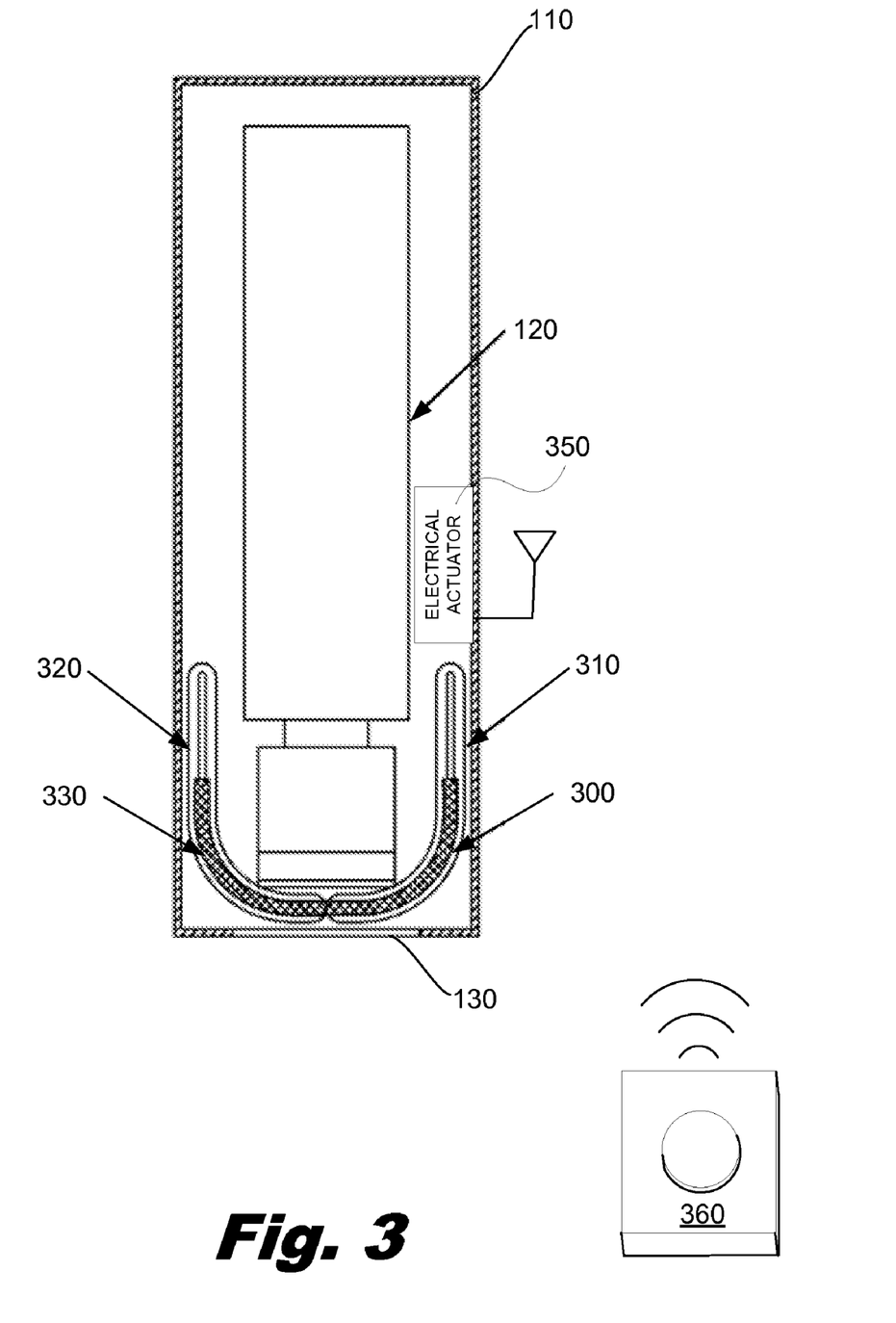
FIG. 3 is a cross-sectional diagram of a surveillance camera and housing, according to principles described herein.

FIGS. 2A, 2B, and 3 show a variety of methods of obscuring the viewing port (130) to restrict the view of the camera contained within the enclosure (110). FIG. 2A shows the viewing port (130) obscured by a variable pinhole mechanism (200). The variable pinhole mechanism (200) comprises a plurality of sliding metal plates that can be opened and closed by means of a mechanical or electrical actuator (350). When the plates are in the closed position, the orifice through which the camera views the surroundings becomes very small or nonexistent.

FIG. 2B shows a viewing port (130) covered with electrochromic glass (210). Electrochromic glass (210) changes its light transmission properties in response to voltage and thus controls the amount of light that pass through the electrochromic glass. By applying a voltage to the electrochromic glass (210), the electrochromic glass (210) can become opaque, thereby limiting the light that that is transmitted to the camera (120).

FIG. 3 shows a cross-sectional diagram a camera (120) and enclosure (110) wherein the enclosure (110) includes a first mechanical door (300) and a second mechanical door (330) that slide on door tracks (310, 320). As shown in FIG. 3, the doors (300, 330) can be moved forward and in front of the camera to obscure the viewing port (130). When the camera is in use, the doors (300, 330) are mechanically or electrically moved along the door tracks (310, 320) to the sides of the camera (120). This allows the camera (120) to view the surroundings through the now unobscured viewing port (130).

All of these methods can be effective in obscuring the view of the camera and in factually preventing surveillance that unnecessarily intrudes on the privacy of individuals within the privacy sensitive area. However, the camera (120) remains physically present in the privacy sensitive area and continues to have a chilling effect on the private activities of the individuals. Further, the methods of obscuring the viewing port (130) are largely unobservable to the individuals. By direct observation, it can be difficult or impossible to determine if the camera is in operation or if the viewing port is obscured. Further, the viewing port may be opened without any overt visual indication to the individual that the camera is commencing surveillance operations. Thus, the described cameras and enclosures have the effect of literally intruding on the privacy of individuals even if the viewing aperture is obscured or the camera is not in operation. This intrusion can be unacceptable in environments such as classrooms, restrooms, medical areas, counseling centers, and other locations where privacy is an important behavioral prerequisite. For example, the surveillance of the interior of a restroom would an inappropriate invasion of privacy in all but the most extreme circumstances.

The need to preserve the safety of individuals can act as counterbalancing consideration when considering surveillance of a privacy sensitive area. A wide variety of threats, such as terrorists, gunmen, or fire, can be present in areas that are typically not appropriate locations for continuous surveillance. When the threat to the individuals' safety exceeds the need for privacy, it can be appropriate to initiate surveillance of the area. Thus, there is a clear need for an apparatus that is configured to visibly remove the inactive camera from privacy sensitive areas during normal activities, but is capable of quickly deploying a surveillance camera to mitigate a significant threat. When the threat level exceeds a certain threshold, the apparatus visibly reintroduces the camera into the area to assess the threat.

Figure 4A:
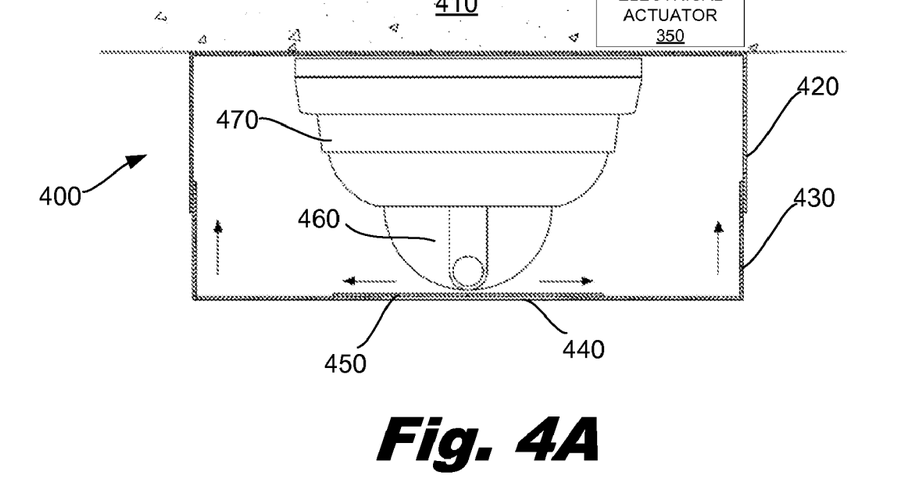
FIG. 4A and FIG. 4B are a partially cut away side view and a bottom view, respectively, of an exemplary surveillance camera and housing in a retracted position, according to principles described herein.
Figure 4B:
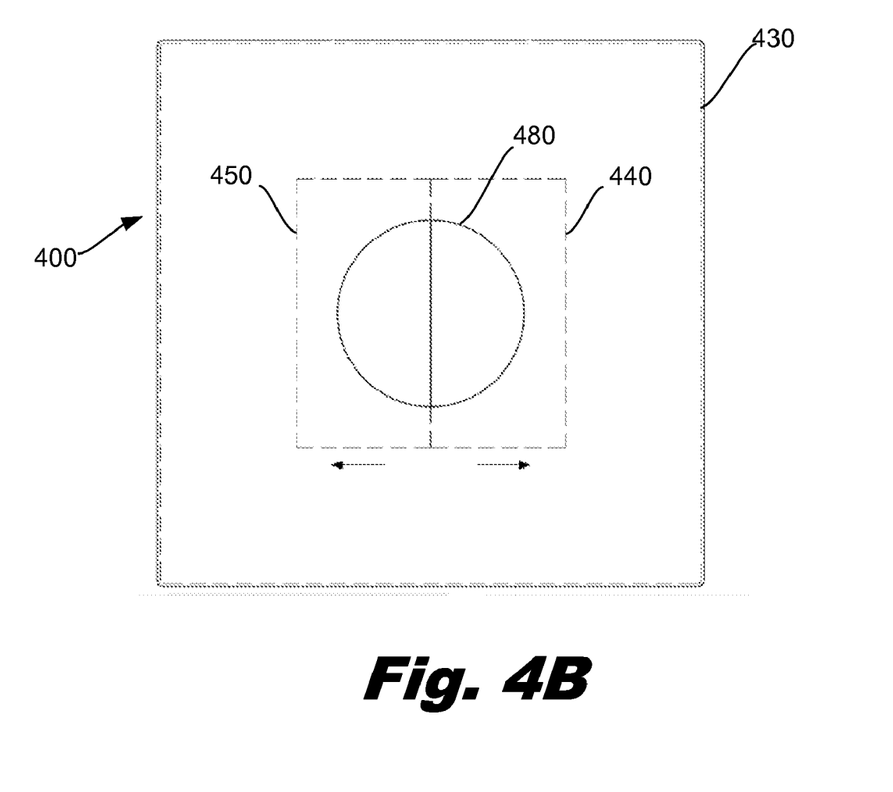

FIG. 4A and FIG. 4B illustrate one exemplary embodiment of a privacy ensuring camera enclosure. FIG. 4A shows a partial cutaway side view of the privacy ensuring camera enclosure (400). In this exemplary embodiment, the camera enclosure (400) is attached to an upper surface (410). The camera enclosure (400) consists of a base (420), a telescoping cover (430) and a plurality of sliding panels (440, 450). The base (420) is attached to the upper surface (410). The base (420) can be attached by a variety of methods including fasteners or adhesive. The base (420) may also include electrical feed throughs for power and communication cables (700).

The telescoping cover (430) is slidably attached to the base (420) such that the telescoping cover (430) can be extended to maximize the volume within the enclosure (400) or retracted to reduce the volume surrounded by the enclosure (400). FIG. 4B shows a bottom view of the enclosure (400). The telescoping cover (430) includes an aperture (480) in its bottom surface. A plurality of sliding panels (440, 450) is configured to selectively cover the aperture (480). In FIGS. 4A and 4B, the sliding panels (440, 450) are shown in a closed configuration. In the closed configuration the sliding panels (440, 450) are adjacent to one another and cover the aperture (480).

In the closed position a camera (460) is entirely contained within the enclosure (400). Because the camera is visibly absent from the privacy sensitive area, the negative intrusion on the privacy of the individuals is minimized. The camera (460) is attached to the base (420) by a pedestal (470). In one exemplary embodiment, the camera (460) is an off-the-shelf dome CCTV camera. The dome CCTV camera can be configured with a plurality of gimbaled stages that allow the camera to be pointed throughout a range of angles.

Figure 5A:
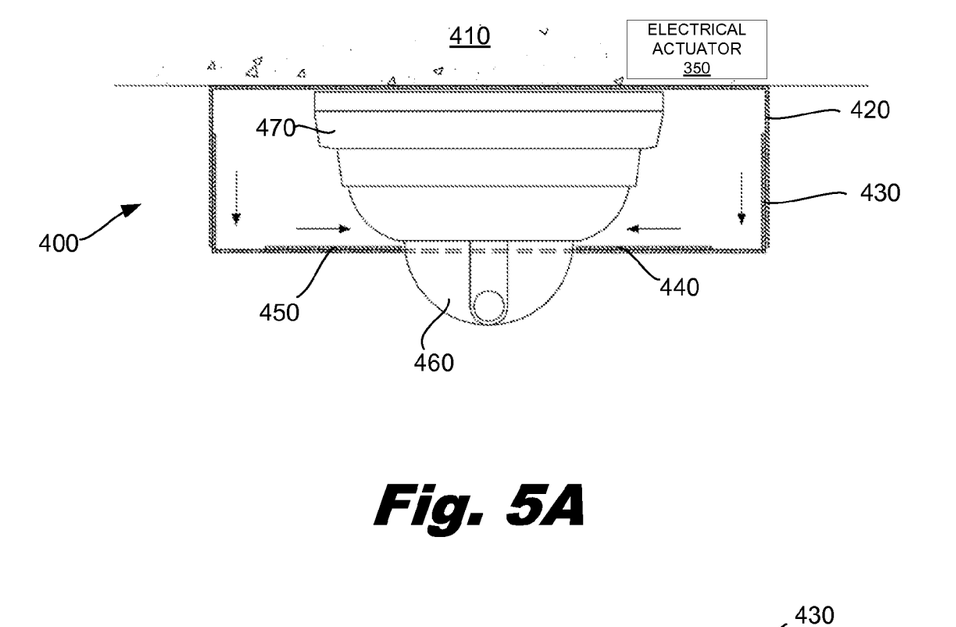
FIG. 5A and FIG. 5B are a partially cut away side view and a bottom view, respectively, of an exemplary surveillance camera and housing in an operation configuration, according to principles described herein.
Figure 5B:
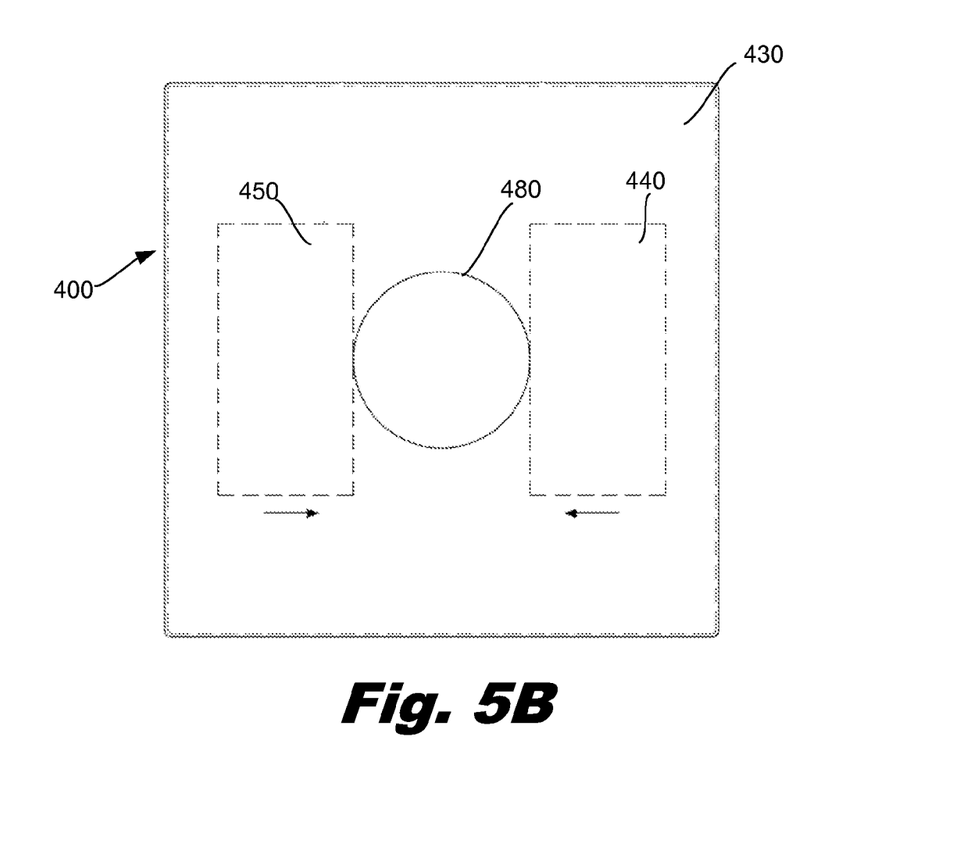

As indicated by the arrows in FIGS. 4A and 4B, the telescoping cover (430) can be retracted into the base (420) and the sliding panels (440, 450) opened. The camera (460) then visibly protrudes out of the enclosure (400) as shown in FIGS. 5A and 5B. By sliding the telescoping cover (430) into the base (420), the height of the enclosure (400) is reduced and the camera (460) extends out of the aperture (480). When the camera (400) is deployed in the manner described above, it enters the privacy sensitive area and can begin operation. The individuals within the privacy sensitive area can immediately ascertain that the camera (460) has entered the area and is in operation.

After the threat level has been reduced, the enclosure (400) can again be actuated to envelope the camera (460). As shown by the arrows in FIGS. 5A and 5B, the telescoping cover (430) is extended and the sliding panels (440, 450) are brought together to cover the aperture (480). The telescoping cover (430) and sliding panels (440, 450) can be actuated in a variety of fashions. In one exemplary embodiment, the telescoping cover (430) and the sliding panels (440, 450) could be manually or mechanically actuated. According to another embodiment, separate electrical actuators (350) could be used actuate the telescoping cover (430) and sliding panels (440, 450). Alternatively, one electrical actuator (350) with mechanical linkages could move both the telescoping cover (430) and sliding panels (440, 450).

Figure 6A:
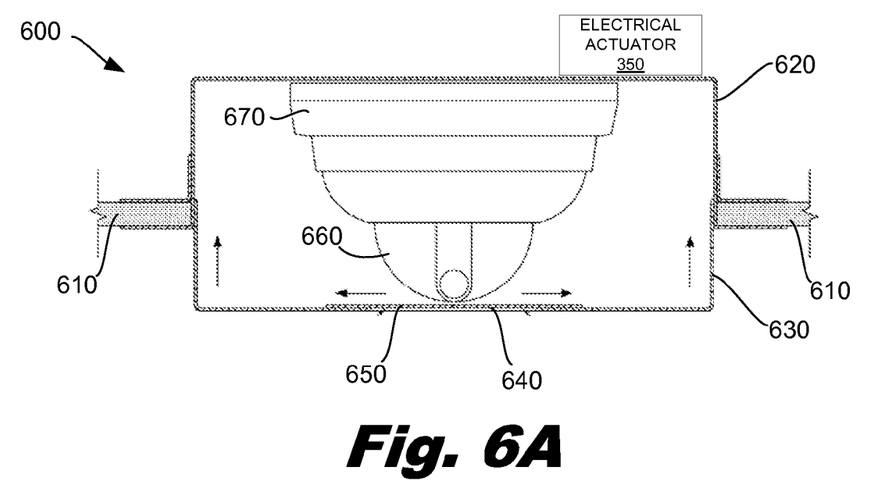
FIG. 6A and FIG. 6B are a partially cut away side view and a bottom view, respectively, of an exemplary surveillance camera and housing in a retracted position, according to principles described herein.

FIGS. 6A through 7B show one exemplary embodiment of a privacy ensuring camera enclosure (600) that is configured to be mounted through a support plate (610). In one exemplary embodiment the support plate (610) may be ceiling tile, drywall attached to the ceiling of a building, plywood, or another building element. FIG. 6A shows a partial cutaway side view of the privacy ensuring camera enclosure (600). The camera enclosure (600) consists of a base (620), a telescoping cover (630) and a plurality of sliding panels (640, 650). The base (620) is attached to the support plate (610) such that a large portion of the enclosure (600) resides above the support plate (610). According to this exemplary embodiment, the camera (660) is oriented within the enclosure to provide surveillance of the area below the support plate (610). In other embodiments, the camera (660) and enclosure (600) could be oriented to provide surveillance of the area above the support plate (610).

Figure 6B:
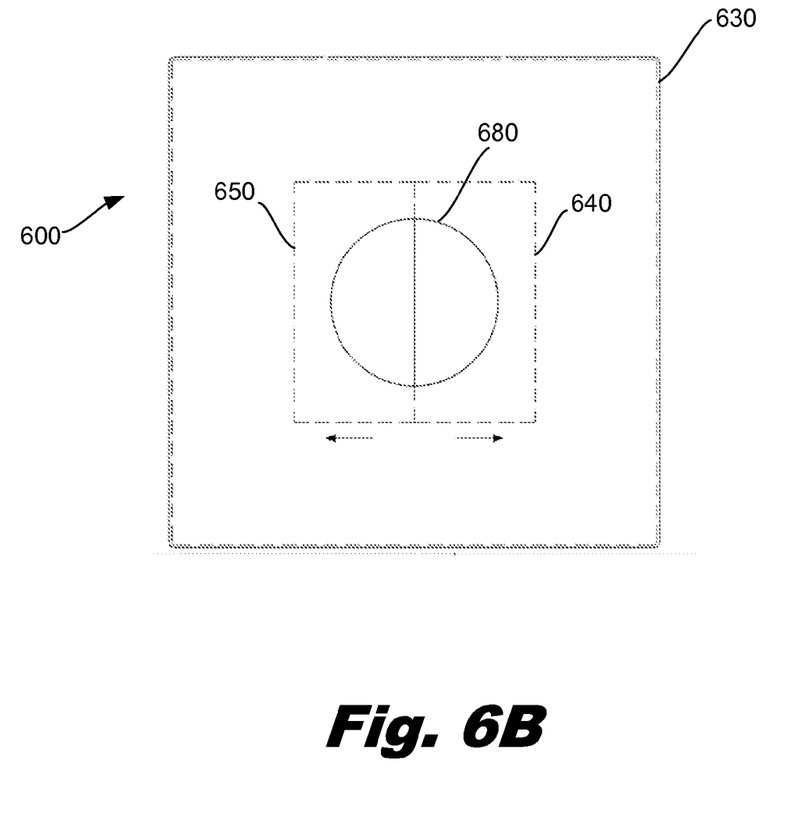

The telescoping cover (630) is slidably attached to the base (620) such that the telescoping cover (630) can be extended to maximize the volume within the enclosure (600) or retracted to reduce the volume surrounded by the enclosure (600). As described previously, the telescoping cover (630) can consist of an aperture (680) and a plurality of sliding panels (640, 650) configured to selectively cover the aperture (680). In FIGS. 6A and 6B, telescoping cover is shown in its fully extended position. When the telescoping cover (630) is fully extended, the enclosure (600) encloses a volume that extends above and below the support plate (610) and entirely contains the camera (660). In the closed configuration, the sliding panels (640, 650) are adjacent to one another and cover the aperture (680). The enclosure (600) has an innocuous visual appearance in its closed position and is unlikely to intrude on the privacy of individuals.

Figure 7A:
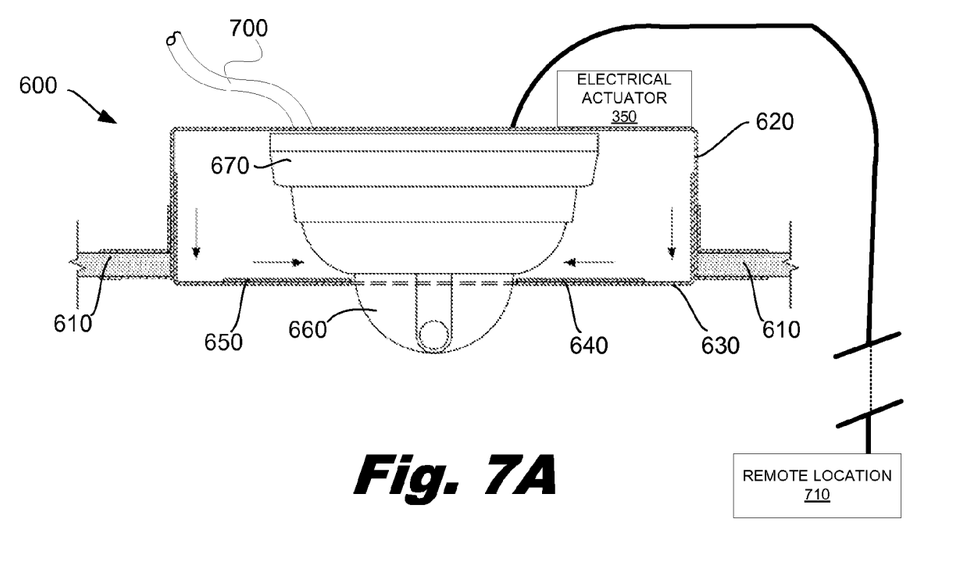
FIG. 7A and FIG. 7B are a partially cut away side view and a bottom view, respectively, of an exemplary surveillance camera and housing in an operation configuration, according to principles described herein.
Figure 7B:
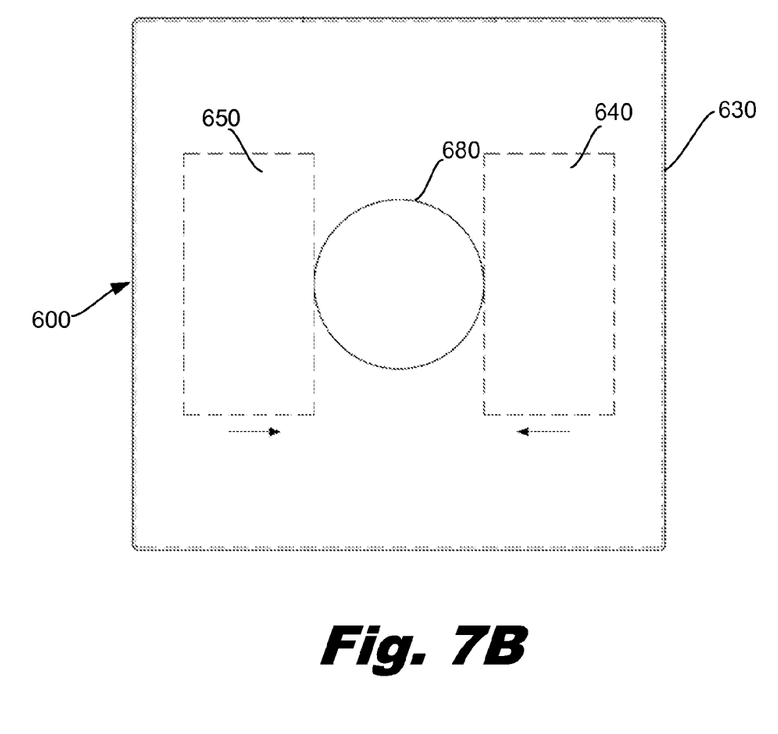

As indicated by the arrows in FIGS. 6A and 6B, the telescoping cover (630) can be retracted into the base (620) and the sliding panels (650, 640) can be opened. By sliding the telescoping cover (630) into the base (620), the height of the enclosure (600) is reduced and the camera (660) extends out of the aperture (680). FIGS. 7A and 7B show the telescoping portion (630) of the enclosure (600) retracted and the camera (660) deployed into the privacy sensitive area. The camera (660) visibly protrudes out of the enclosure (400) as shown in FIG. 7A. According to one exemplary embodiment, the telescoping cover (630) is substantially flush with the support plate (610). Because the camera (660) now visibly extends into the privacy sensitive area, individuals can immediately ascertain that the camera (660) has entered the area and is in operation.

After the threat level has been reduced, the enclosure (600) can again be actuated to envelope the camera (660). As shown by the arrows in FIGS. 7A and 7B, the telescoping cover (630) is extended and the sliding panels (640, 650) are brought together to cover the aperture (680). As mentioned above, the telescoping cover (430) and sliding panels (440, 450) can be actuated by a variety of mechanisms and in a variety of fashions.

Figure 8:
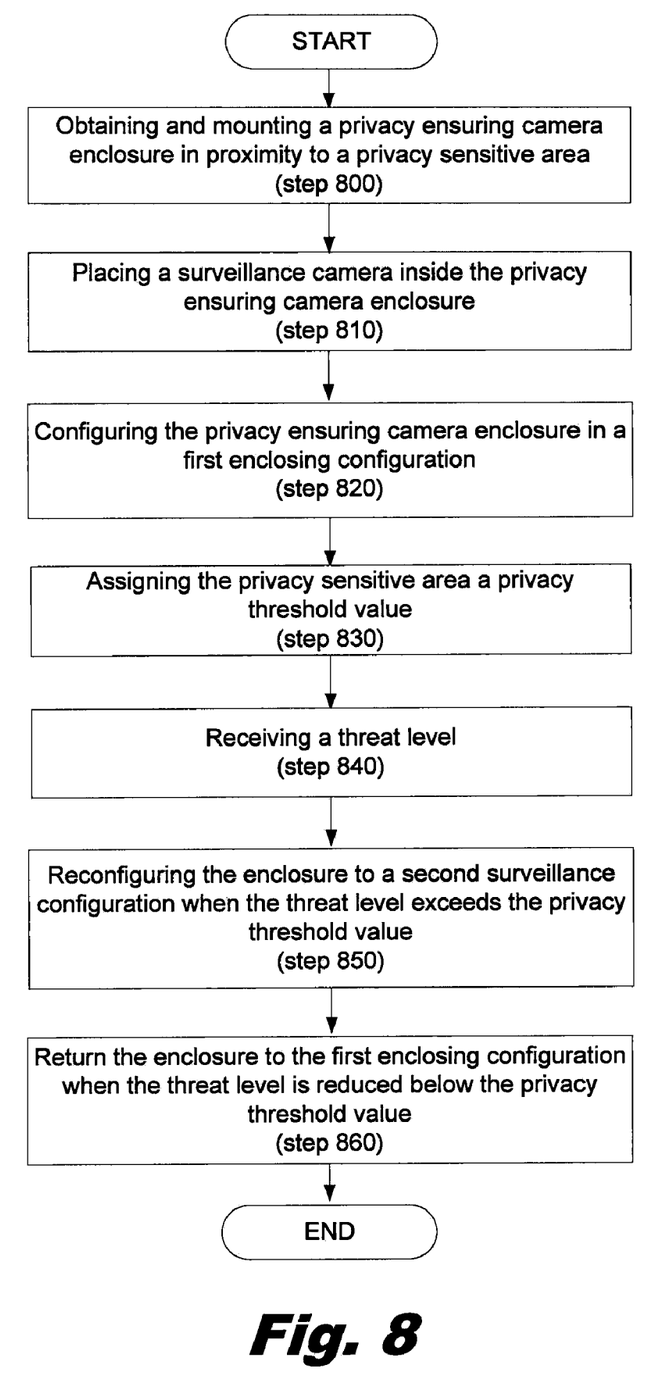
FIG. 8 is a flow chart illustrating one exemplary method of selectively monitoring a privacy sensitive area using a privacy ensuring camera enclosure, according to the principles described herein.

FIG. 8 illustrates a method of selective surveillance within a privacy sensitive area. A privacy ensuring camera enclosure is obtained and mounted in proximity to a privacy sensitive area (step 800). As mentioned above, the enclosure can be mounted in a variety of locations and orientations. By way of example and not limitation, the enclosure could be mounted on wall, ceiling, item of furniture such as a cabinet, or on a pole. Additionally, as shown in FIGS. 6A through 7B, the enclosure could be partially or completely recessed into the support structure.

A surveillance camera is then mounted within the privacy ensuring camera enclosure (step 810). The surveillance camera can be any available cameras suitable for the specific surveillance environment. The necessary connections to the surveillance camera, such as power and communication cabling (700), can be made. In one exemplary embodiment, no external power or connections are required. In this embodiment, a battery powered camera is wirelessly configured to transmit imagery to a remote base station.

The privacy ensuring camera enclosure is then configured in a first enclosed configuration (step 820). As discussed above, the security camera is not visible to individuals when the enclosure is in the enclosed configuration and does not significantly intrude on the perception of privacy of the individuals within the privacy sensitive area.

The privacy sensitive area is then assigned a privacy threshold value corresponding to the level of privacy that is conducive to the normal activities that occur within the area. For example, in an education setting, a library area may have a lower privacy threshold than a restroom or locker room area. Thus a correspondingly higher threat level would be required exceed the privacy threshold value of the restroom or locker room area.

The threat level is then received (step 840). The threat level may be receive from a variety of sources including but not limited to Federal, State, and Local governments such as the Homeland Security Advisory System for terrorist threats (HSAS) or the National Oceanic & Atmospheric Administration for natural disasters (NOAA). Further, manually authorized threat level sources may include, but are in no way limited to supervisors, principals, or other supervisory personnel. Additionally, the threat level can be received from panic buttons, emergency transmitters, fire alarms, or other devices (360). The inputs from these sources can be combined and/or analyzed to determine the applicability of the information to the privacy sensitive area. The combination of the threat communications as applied to the privacy sensitive area can generate a specific threat level.

If the specific threat level exceeds the privacy threshold value, the privacy ensuring enclosure can be dynamically reconfigured to a second surveillance configuration (step 850). As previously described, the telescoping cover is retracted into the base and the aperture cover can be opened to allow the camera to be deployed into the privacy sensitive area. The camera visibly protrudes out of the enclosure and individuals can immediately ascertain that the surveillance camera is in operation.

When the specific threat level is reduced below the privacy threshold level of the privacy sensitive area, the privacy ensuring camera enclosure can be returned to its first enclosed configuration (step 860), thereby removing the camera from the privacy sensitive area.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A privacy ensuring camera enclosure comprising:
a housing defining an aperture;
a camera coupled within said housing;
a sliding cover moveably coupled to said housing, wherein said sliding cover is configured to selectively slide relative to said camera in response to a received communication;
wherein said sliding cover is further configured to translate from a first position to a second position via an electrical actuator, wherein said first position orients said sliding cover over said aperture of said housing to optically cover said camera; and
wherein said second position translates said sliding cover away from said aperture to optically uncover said camera, visibly exposing said camera.

2. The privacy ensuring camera enclosure of claim 1 wherein said sliding cover is configured to envelop said camera when said sliding cover is in said first position.

3. The privacy ensuring camera enclosure of claim 1 wherein said sliding cover retracts into said housing to expose said camera.

4. The privacy ensuring camera enclosure of claim 3 wherein said sliding cover comprises a plurality of sliding panels slidably actuated to be selectively positioned in said housing.

5. The privacy ensuring camera enclosure of claim 4 wherein said camera protrudes through said aperture when said sliding cover is in said second position.

6. The privacy ensuring camera enclosure of claim 1 wherein said received communication comprises a communication indicating a change in a threat level evaluation.

7. The privacy ensuring camera enclosure of claim 1, wherein said electrical actuator is remotely actuated from a communication device that is physically separated from the privacy ensuring camera enclosure.

8. The privacy ensuring camera enclosure of claim 7, wherein said communication device comprises one of a panic button, an emergency transmitter, or a fire alarm.

9. The privacy ensuring camera enclosure of claim 1, wherein said camera is configured to transmit imagery to a remote location when in said second position.

10. The privacy ensuring camera enclosure of claim 9, wherein said imagery is viewed at said remote location.

11. The privacy ensuring camera enclosure of claim 9, wherein said imagery is recorded at said remote location.

12. The privacy ensuring camera enclosure of claim 1, wherein said housing defines at least one electrical feed through configured to receive a power cable.

13. A dynamic camera enclosure having a camera enclosing configuration and a surveillance configuration;
Wherein said dynamic camera enclosure includes a fixed base, a surveillance camera coupled to said base, and at least one optically opaque sliding panel coupled to an electrical actuator and disposed on said dynamic camera enclosure, said at least one sliding panel being configured to slideably translate via said electrical actuator around said camera to selectively cover a lens of said camera when in said camera enclosing configuration, and to slideably translate away from said lens of said camera, visibly showing said camera, when in said surveillance configuration.

14. The dynamic camera enclosure of claim 13 wherein said camera enclosing configuration entirely surrounds a surveillance camera with said at least one optically opaque sliding panel such that said surveillance camera is visibly removed from a privacy sensitive area into said enclosure.

15. The dynamic camera enclosure of claim 14 wherein said surveillance configuration includes sufficient translation of said at least one optically opaque sliding panel away from said camera to visibly expose said surveillance camera and enable said camera to acquire surveillance information.

16. The dynamic camera enclosure of claim 13 wherein said dynamic camera enclosure is configured to be remotely actuated between said camera enclosing configuration and said surveillance configuration.

17. The dynamic camera enclosure of claim 16 wherein said camera enclosing configuration comprises a non-linearly sliding a section of said camera enclosure configured to cover an aperture of said surveillance camera when in said camera enclosing configuration.

18. The dynamic camera enclosure of claim 17 wherein said dynamic camera enclosure transitions from said enclosing position to said surveillance configuration by retracting said non-linearly sliding section and uncovering said aperture.

19. A privacy ensuring camera enclosure comprising:
a ceiling mounted support plate configured to define a ceiling plane;
a base coupled to said ceiling mounted support plate;
a housing coupled to said base;

a camera coupled to said base, wherein said camera is mounted on said base below said ceiling mounted support plate;

an electrical actuator coupled to said base; and a slideable cover moveably coupled to said base via said electrical actuator, wherein said slideable cover is configured to selectively slide via said electrical actuator relative to said ceiling mounted support plate and said camera;

wherein said slideable cover includes at least one sliding panel that is configured to selectively translate from a first position to a second position, wherein said first position orients said slideable cover and said housing around said camera to optically cover said camera; and wherein said second position translates said at least one sliding panel to withdraw said sliding cover away from said camera to enable the operation of said camera.

* * * * *